United States Patent Office 3,522,078
Patented July 28, 1970

3,522,078
PROCESS OF TREATING TITANIUM DIOXIDE
Russell R. May, Jr., Wadsworth, and Robert H. Walsh, Akron, Ohio, assignors to PPG Industries, Inc., a corporation of Pennsylvania
No Drawing. Filed Apr. 21, 1967, Ser. No. 632,567
Int. Cl. C09c 1/36
U.S. Cl. 117—100                                14 Claims

ABSTRACT OF THE DISCLOSURE

Pigmentary titanium dioxide is coated with hydrous metal oxides, such as titania, alumina, and silica, to improve the pigment's physical properties. Specific steps in the coating procedure are discussed and embodiments resulting in improved pigmentary properties are described.

BACKGROUND OF THE INVENTION

Titanium dioxide pigment is produced commercially by at least two different manufacturing processes. One such process is known as the sulfate or acid process. In the sulfate process, a titaniferous ore, such as ilmenite, is digested in sulfuric acid to form a digest cake. The cake is dissolved in an aqueous medium to form a sulfate solution which, after clarification and concentration, is hydrolyzed to precipitate an insoluble titanium dioxide hydrolysate. The hydrolysate is filtered, washed, and eventually calcined at temperatures ranging between 750° C. and 1000° C. to further develop pigmentary properties. Such pigment is often referred to as "sulfate pigment."

Another and more recent process developed for preparing pigmentary titanium dioxide is that of vapor phase oxidation of titanium tetrahalide. Typically, this method involves reacting vaporous titanium tetrahalide and at least a stoichiometric amount of an oxygen-containing gas in a reaction zone at elevated temperatures, e.g., above about 500° C., usually between about 800° C. and about 1600° C. Pigment prepared by such a process is often referred to as "chloride pigment." The aforementioned vapor phase oxidation process is suitably described in issued U.S. Pats. 3,068,113 to Strain et al. and 3,214,284 to Wilson, which are incorporated herein, in toto, by reference.

Although titanium dioxide produced by either method has relatively good pigmentary properties, the optimum pigmentary properties required for commercial utilization in paints and other applications are, generally, not completely developed. For example, the tinting strength, oil absorption, relative hiding power, and dispersion of such pigment is not fully developed. Accordingly, it is conventional in the pigment industry to coat raw titanium dioxide pigment, i.e., pigment as initially prepared from titaniferous ore, with hydrous metal oxides, e.g., metal oxides of silicon, titanium, and aluminum, in order to improve the properties of the pigment. Coating of titanium dioxide pigment with hydrous metal oxides is usually performed in an aqueous slurry of pigment. Typically, the aqueous slurry is prepared and compounds yielding hydrous metal oxides on hydrolysis added to the slurry individually. It has also been proposed to add a coating solution comprising aluminum and titanium coating compounds to the aqueous pigment slurry. See, for example, U.S. 3,146,119. As described, in this patent, aqueous acidified silicic acid having a pH below 4.5 is usually used to produce the hydrous silicon oxide coating. However, when hydrolyzable basic silicon compounds, i.e., compounds producing a pH of 7+ on hydrolysis, are used in place of acidified silicic acid in the coating process, the pigmentary properties of the coated pigment have suffered.

SUMMARY OF THE INVENTION

This invention relates to the treatment of pigmentary titanium dioxide. In particular, this invention relates to a process of coating such pigment with hydrous metal oxides to improve the pigment's properties and, more particularly, relates to a coating process which results in increasing the pigment's tinting strength and oil absorption.

In accordance with the process of the present invention, it has now been found that if the hydrolyzable metal compounds from which the hydrous metal oxide coatings are derived and an aqueous slurry of titanium dioxide pigment are simultaneously admixed, e.g., by admixing a premixed coating solution with the aqueous pigment slurry, titanium dioxide pigment having improved pigmentary properties, e.g., tinting strength, is obtained. In particular, it has been found that admixing a premixed coating solution comprising hydrolyzable compounds of aluminum, titanium, and silicon with an aqueous slurry of titanium dioxide pigment produces an improved pigment than when such compounds are added individually. Moreover, it has been found that when hydrolyzable silicon compounds that form a basic solution or hydrolysis, i.e., a pH of 7+, are used, it is desirable and preferred to add hydrolyzable metal compounds of aluminum and titanium to such hydrolyzable silicon compounds when preparing a coating solution. Acceptable results can be obtained when the aforementioned sequence is not followed by adding the hydrolyzable aluminum compound subsequent to the hydrolyzable silicon compound during preparation of the coating solution. Preferably, the preformed coating solution or mixture is prepared or held at a pH of less than about 2.5 before being admixed with the pigment slurry.

DETAILED DESCRIPTION

The presently described invention is applicable to titanium dioxide pigment regardless of the mode of its preparation. Of the two conventional processes, i.e., the sulfate and chloride processes, the chloride process will be described hereinafter more fully.

Titanium tetrahalides that can be employed in a vapor phase oxidation reaction for the production of titanium dioxide pigment include: titanium tetrachloride, titanium tetrabromide, titanium tetraiodide, and mixtures thereof. Titanium tetrachloride is economically preferred.

The oxygen-containing gas utilized to oxidize the titanium tetrahalide can be composed solely of oxygen or may be a diluted stream containing elemental oxygen. Such a diluted stream includes, for example, air, oxygen-enriched air, or elemental oxygen mixed with the products of a combustible gas, such as carbon monoxide. The latter mixture can be formed by igniting a mixture of excess oxygen and carbon monoxide gas in a combustion zone removed from the vapor phase oxidation reaction zone. Typically, the amount of oxygen supplied to the vapor phase oxidation reaction will be in substantially stoichiometric amounts so as to convert all titanium tetrahalide introduced to titanium dioxide in accordance with the balanced equation.

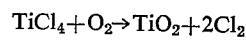
$$TiCl_4 + O_2 \rightarrow TiO_2 + 2Cl_2$$

Although greater or slightly less than stoichiometric quantities of oxygen can be employed, the amount of oxygen used will generally vary from 0.9 to 2.5 times that of stoichiometric quantities, based on the titanium tetrahalide. It is further desirable that the amount of oxygen employed be not greater than 10 percent above that required by the above-described equation. Thus, the amount of oxygen introduced to the vapor phase oxidation reaction zone usually ranges from 1.01 to 1.5 moles of oxygen for each mole of titanium tetrahalide fed to the reaction zone. More than stoichiometric quantities of oxygen is provided to insure complete oxidation of the titanium tetrahalide, as well as oxidation of other metal halide additives which are added to the reaction zone.

Often an inert gas is employed to shroud the oxygen-containing stream from the titanium tetrahalide so as to prevent premature oxidation of the reactants and encrustation of metal surfaces with titanium dioxide. Typical of such inert gases include nitrogen, carbon dioxide, chlorine, and the noble gases such as argon, krypton and neon. Chlorine is preferred. Typically, the amount of inert gas fed to the reactor is in the order of from 0.01 to 200 mole percent, based on the moles of titanium tetrahalide introduced. Preferably, inert gases are employed in amounts of between about 5 and about 100 mole percent.

The reaction zone is maintained at temperatures at which the titanium tetrahalide reacts with oxygen. As a rule, the temperature of the reaction zone can vary from about 500° C. to about 1600° C., or higher, preferably, from about 950° C. to about 1500° C.

The reaction zone temperature can be achieved by preheating the reactants prior to their introduction to the reaction zone, or by other conventional methods known in the art, e.g., a fueled burner that provides hot combustion products for the reaction zone. Thus, the oxygen-containing stream and the titanium tetrahalide-containing stream can be heated to temperatures which, on mixing, result in a reaction zone temperature sufficient to cause the reactants to react and form titanium dioxide with the liberation of chlorine gas. Advantageously, the temperature of the oxygen-containing stream is greater than that of the titanium tetrahalide-containing stream, although the reverse is possible. For example, the temperature of the oxygen-containing stream can range from about 1100° C. up to 2500° C. or higher, while the temperature of the titanium tetrahalide-containing stream can range from 140° C. up to, for example, 1000° C. Although both streams can be introduced at the same temperature, it is preferred that the oxygen-containing stream be introduced at a much higher temperature than that of the titanium tetrahalide-containing stream due to the extreme corrosive nature of titanium tetrahalide, e.g., titanium tetrachloride, at high temperatures. Hot combustion gases are often used to supplement the heat introduced by virtue of the heated reactants in order to maintain the reaction zone temperature at required levels.

Due to its highly corrosive nature, the titanium tetrahalide-containing stream will typically be introduced at temperatures below about 500° C. and, preferably, below about 400° C., but above the condensation temperature of the titanium tetrahalide. When mixtures of oxygen and titanium tetrahalide are employed, such mixtures are generally introduced to the reaction zone at temperatures below reaction temperature, i.e., below about 500° C. In this latter case, heat energy is supplied to the reaction zone by inert gases, combustion gases from the oxidation of suitable carbonaceous materials or by other suitable means described in the art.

The product stream from the vapor phase oxidation reaction described hereinabove typically comprises a suspension of titanium dioxide in a gaseous stream comprising unreacted oxygen, liberated halogen, e.g., chlorine, and minor amounts of unreacted titanium tetrahalide. Combustion gases and other vaporous reactant or inert gases introduced to the reaction zone can also be present. Their presence depends upon the exact manner the oxidation reaction is performed. The solid titanium dioxide product is separated from the gaseous component of the product stream by conventional methods and thereafter subjected to various treatments to improve its physical properties. One such treatment includes coating the surface of the pigment particle with hydrous oxides of silicon, titanium, and aluminum. Such a procedure is described in U.S. Pat. 3,146,119, isued to Hartien S. Ritter, which patent is incoruorated herein by reference.

Generally, the coating process is performed in an aqueous medium and comprises adding hydrolyzable compounds of silicon, aluminum, and titanium that yield silica, alumina, and titania, hydrates respectively, upon hydrolysis, to an aqueous slurry of the titanium dioxide pigment. The aqueous slurry typically comprises less than 85 weight percent titanium dioxide and preferably comprises from 10 to 30 weight percent titanium dioxide, usually 20 weight percent. The titanium dioxide pigment, before treatment, usually has a particle size below 0.75 micron, and preferably has a particle size distribution of from about .20 to about 0.35 micron.

An aqueous slurry of "chloride pigment" typically has a pH below about 5.0, due to the residual chloride content of the pigment. However, if the pigment is thoroughly degassed or calcined, a slurry of chloride pigment will not have this low a pH. Sulfate pigment ordinarily does not form as acidic a slurry as chloride pigment due to the conventional calcination of sulfate pigment during its preparation. In accordance with the present invention, an aqueous titanium dioxide slurry is admixed with a coating solution having a pH of less than about 2.5 and comprising hydrolyzable compounds of aluminum, titanium, and silicon. The pH of the resulting admixture should be less than 5, preferably less than about 3.5 and more preferably from about 1 to 2. Typically, the desired pH can be effected and/or maintained as a result of the residual chlorine content of "chloride pigment," by the acidic character of hydrolyzable titanium and aluminum compounds added to the slurried pigment, by the addition of sufficient acid ions, preferably chloride ions, to give the desired pH, and by any combination of one or more of the aforesaid methods. Acid ions (anions) can be furnished to the aqueous pigment slurry or coating solution by mineral acids, such as sulfuric acid, hydrochloric acid, hydrobromic acid, nitric acid, etc., or by the hydrolyzable compounds themselves, e.g., titanium tetrachloride and aluminum chloride. Preferably, the majority of the acid ions maintained in the slurry are chloride ions. Thus, the molecular majority, i.e., more than 50 mole percent, preferably more than 65 to 75 mole percent, of the acidic ions in the slurry prior to separation of the pigment from the slurry are advantageously chloride ions.

The pH of the acidified slurry is then raised with an alkaline agent to precipitate hydrous oxides of the metal coating compounds added to the slurry and to a level at which the pigment, coated with such hydrous oxides flocculates or coagulates. The floc is then usually filtered, washed, dried, and fluid energy milled (micronized) in that order.

The water in which the pigment is slurried should be such so as not to incorporate harmful contaminants into the pigment, i.e., the water should be relatively pure, e.g., deionized or distilled water.

Titanium compounds that can be used in the present process are water soluble compounds of titanium from which there can be precipitated titanium oxide, a titanium oxide hydrate, e.g., $Ti(OH)_4$, $TiO_2 \cdot xH_2O$, $TiO(OH)_2$, or a titanium hydrate condensate, e.g.,

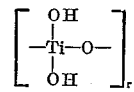

wherein $r$ is at least 2, or mixtures thereof upon hydrolysis. Examples of suitable titanium compounds include: titanium tetrachloride, titanium tetraiodide, titanium tetrabromide, titanium sulfate, titanyl sulfate, titanium esters, such as tetraethyl titanate, tetra-2-chloroethyl titanate, tetraoctyl titanate, tetraphenoxy titanium, and alkali metal titanates, e.g., lithium, sodium, and potassium titanates. Likewise, tetra-acyloxy titanium, for example, tetra-acetyl titanium and tetrabutyric titanium can be employed. Titanium tetrachloride is economically preferred.

Aluminum compounds that can be used in the present process are water soluble compounds of aluminum from which there can be precipitated Al(OH)$_3$, an aluminum oxide hydrate, or an aluminum hydrate condensate, e.g.,

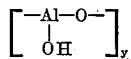

wherein $y$ is at least 2, or mixtures thereof upon hydrolysis. Aluminum condensates include low molecular weight Al$_2$O$_3$ containing hydroxyl groups. Such condensates can be characterized as a low molecular weight aluminoxy polymer having the repeating unit:

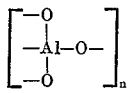

wherein $n$ generally has a value of 2 or more. The free valances of the repeating unit are attached to hydrogen, alkoxy, aryloxy, acyloxy, Al(OH)$_2$ radicals or cross-linked with other materials of the same unit formula.

Examples of suitable aluminum compounds include: aluminum chloride, aluminum bromide, aluminum sulfate, alkyl and aryl aluminum, such as triethyl aluminum, trihexyl aluminum, and triphenyl aluminum. Likewise, alkoxy and aryloxy aluminum, such as triethoxy aluminum, tributoxy aluminum, and triphenoxy aluminum can be employed. Acyloxy aluminum, such as triacetyl and cyclic aluminoxy trimers, such as trimethoxy trialuminoxy can also be used. Aluminum chloride and aluminum sulfate are preferred.

Silicon compounds that can be used in the present process are water soluble compounds of silicon that form a basic solution on hydrolysis, i.e., a solution having a pH of 7+, and from which there can be precipitated a silica hydrate, e.g., Si(OH)$_4$, SiO$_2$·$x$H$_2$O, SiO(OH)$_2$, silicon oxide, or a silicon hydrate condensate, e.g.,

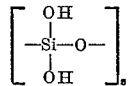

wherein $s$ has a value of at least 2, or mixtures thereof upon hydrolysis. As used hereinafter, such compounds will be referred to as basic silicon compounds. Examples of suitable silicon compounds include: silicic acid, SiH$_4$, Si(OOCCH$_3$)$_4$, Si(NH$_2$)$_4$, Si(OCH$_2$CH$_3$)$_4$, alkali metal silicate, e.g., sodium, lithium, and potassium silicates, or other such hydrolyzable silicon compounds. Other silicon compounds which can be employed are those which on hydrolysis form silicic acids, condensed silicic acids, and mixtures thereof. The alkali metal silicates are preferred. Aqueous solutions to which have been added the above compounds can be employed.

The titanium compound, preferably titanium tetrachloride, is added to the titanium dioxide pigment slurry in an amount sufficient to coat the pigment with from 0.05 to 10 percent, preferably from 0.1 to 3 percent by weight, calculated as titanium dioxide, based on the weight of the pigment.

The aluminum compound, preferably AlCl$_3$ or Al$_2$(SO$_4$)$_3$, is added to the pigment slurry in an amount sufficient to coat the titanium dioxide pigment with from 0.05 to 15 percent, preferably from 0.5 to 5 percent by weight, calculated as Al$_2$O$_3$, based on the weight of the pigment.

The silicon compound, preferably silicic acid or sodium silicate is added to the pigment slurry in an amount sufficient to coat the titanium dioxide pigment with from 0.01 to 10 percent, preferably from 0.4 to 4 percent by weight, calculated as SiO$_2$, based on the weight of the pigment.

The above quantities of silicon, aluminum, and titanium compounds added to the pigment slurry are typical of those amounts added. Quantities greater or less than those recited can be employed. The total amount of hydrous oxide coating placed on the titanium dioxide pigment typically ranges from about 2 to about 20 weight percent, preferably 3–15 weight percent, based on the weight of the pigment.

In accordance with a preferred embodiment of the present invention, the above-described hydrolizable metal compounds are premixed in relatively pure water, e.g., deionized or distilled water, while maintaining said mixture at a pH of below about 2.5, preferably below about 2.0. The pH of the deionized or distilled water can be obtained by adding to such water a mineral acid, such as sulfuric, hydrochloric, nitric, or hydrobromic acid. Hydrochloric or sulfuric acid is preferred. In a particular embodiment, the hydrolyzable basic silicon compound, e.g., sodium silicate, is added to deionized or distilled water having a pH of below about 2.5. Following the addition of the basic silicon compound, the hydrolyzable aluminum and titanium compounds are admixed therewith in either order or simultaneously. Preferably, the titanium compound is added before the aluminum compound. It is desirable to maintain a pH of below about 2.5 for the reason that above such pH precipitates of one or more of the hydrolyzable coating compounds are formed. It has been found further that the above described sequence of steps results in the coated pigment having a higher tinting strength and oil absorption than with other coating procedures. The addition of a hydrolyzable aluminum compound before the basic silicon compound also results in a precipitate being formed in the coating solution.

In a less preferred embodiment, the hydrolyzable titanium compound is first added to relatively pure, e.g., deionized or distilled, water followed in sequence by the addition of the silicon and aluminum compounds. In this embodiment, the water can be acidified before the addition of the metal compounds if the titanium compound does not produce an acid solution of pH less than 2.5. In another embodiment, the metal coating compounds are admixed at a pH above 2.5, acidified to a pH below 2.5, and held at that pH until any white precipitate in the solution has dissolved. Alternatively, the precipitate can be removed by filtration or other conventional means.

The coating solution (or mixture) can be prepared at room temperature, i.e., 20–25° C., or such temperatures at which the titanium dioxide slurry is subjected during subsequent processing, e.g., digestion, filtering, drying. It has been found desirable to maintain the pigment slurry at temperatures of from about 60° C. to 85° C. Such temperatures improve flocculation, ease of filtering and washing of the precipitated coated pigment. Thus, after the coating solution or mixture is prepared, it is admixed with an aqeuous slurry of titanium dioxide pigment at temperatures of from room temperature, e.g., 20–25° C., to 100° C. The titanium dioxide pigment employed can be raw or uncoated pigment or can be pigment which has already been subjected to one or more coating procedures, e.g., in the preparation of titanium dioxide having multiple hydrous oxide coatings. The amount of coating solution used is sufficient to yield hydrous oxide coatings in accordance with the ranges recited hereinabove. Admixture of the coating solution and pigment slurry can be accomplished in any suitable manner. Thus, the coating solution can be added to an aqueous slurry of pigment or the pigment can be added to an aqueous slurry containing the hydrolyzable coating compounds.

Titanium dioxide exists well dispersed in an aqueous slurry when the pH of the slurry is below about 5. At a pH of above about 5, the pigment starts to coagulate from the slurry in floc form. A floc is formed when at least two pigment particles flocculate, that is, become lightly cemented. These flocs, however, can be broken up readily to the ultimate particle by grinding.

The aqueous pigment slurry containing the coating solution is usually maintained at a pH of below about 5, preferably below about 2 and at temperatures of from about 30 to about 100° C., preferably from about 60 to about 85° C., for periods ranging from 5 minutes to 6 hours, preferably from about 1½ hours to 3 hours, in order to digest the slurry.

After the coating solution is added or after it is added and the pigment slurry digested, the slurry is gradually neutralized (adjusted) by any suitable alkaline agent to a pH that is desired for the finished coated pigment. Such values usually range from a pH of 6.5 to a pH of 10. Upon neutralization, the titanium dioxide pigment will precipitate in flocculated form containing hydrolyzed aluminum, titanium, and silicon compounds, i.e., hydrous oxides of silicon, titanium, and aluminum, on the surface of the pigment particles.

Generally, any alkaline agent can be employed for neutralizing the acid pigment slurry, that is, to bring the slurry into the floc-forming range, i.e., a pH range of from 5 to 8.3. Preferably, the alkaline material forms a halogen salt which is soluble in the liquid medium employed to wash the flocculate pigment. Some alkaline materials found suitable for this purpose include: ammonia, alkali metal and alkaline earth metal hydroxides or carbonates, e.g., potassium hydroxide, sodium hydroxide, lithium hydroxide, calcium hydroxide, magnesium hydroxide, calcium carbonate, potassium carbonate, sodium carbonate, potassium hydrogen carbonate, sodium hydrogen carbonate; primary amines, e.g., ethylene diamine, or ethylamine; secondary amines, e.g., diethanolamine or diethylene triamine; tertiary amines, e.g., pyridine, or triethylamine; and quaternary ammonium hydroxides, e.g., benzoyl trimethylammonium hydroxide. Also suitable are polymeric materials such as water-soluble polyvinyl pyridinium hydroxide or polyvinyl pyridinium carbonate.

The slurry containing flocculated pigment can also be digested for a time period, e.g., from about 30 minutes to about 20 hours, preferably, 1 hour to 3 hours, at temperatures of from 60° C. to 95° C. to insure proper setting of the hydrous oxide coating. Following digestion, the coated pigment is recovered by conventional means, such as filtration or other hydroseparation means, and washed to remove impurities such as salts of hydrolysis. The resultant pigment is dried and is then usually ground or milled in a ball mill, jet mill, or fluid energy mill (micronizer).

Prior to the coating of the pigment, various additives can be introduced to the slurry to disperse the pigment and thereby facilitate its wet coating with the hydrolyzed titanium, silicon, and aluminum compounds. Such dispersants are added either before or after the slurry is adjusted with the alkaline agent. Examples of such dispersants, but not by way of limitation are: primary amines, such as ethylene diamine or ethylamine; secondary amines, such as diethanol amine or diethylene triamine; tertiary amines, such as pyridine or triethylamine; and quaternary ammonium hydroxide, such as benzyl trimethyl ammonium hydroxide. Likewise, water soluble phosphates can be used as dispersants. Of particular use are those of sodium, such as hydrous or anhydrous sodium ammoinum phosphate, sodium hypophosphate, sodium hypophosphite, monosodium phosphate, disodium phosphate, trisodium phosphate, sodium metaphosphate, tetrasodium pyrophosphate, disodium pyrophosphate, sodium orthophosphate, sodium hexametaphosphate, and sodium tripolyphosphate. Likewise, the same or similar soluble phosphates of potassium, ammonium, and lithium may be amployed, particularly the tripolyphophates, hexametaphosphates, and tetraphosphates.

In a still further embodiment, flocculating agents can be employed, e.g., $MgSO_4 \cdot 7H_2O$, in amounts ranging from 0.01 to 4 percent, preferably 0.1 to 1 percent, by weight based on the amount of $TiO_2$ pigment. Likewise, water soluble high molecular weight polyacrylamide polymers can be employed as flocculating agents.

After filtering the flocculated pigment slurry, impurities such as salts are removed by the washing of the flocs with an extractant such as water, alcohols, ethers, ketones, or mixtures of same. Examples of such organic extractants include: methanol, ethanol, propanol, butanol, 1-hexanol, 2-ethylhexanol, as well as isomers and mixtures thereof; butyl ether, ethyl ether, hexyl ether, isopropyl ether, dibutyl carbitol, dichloroethyl ether, diethyl oxide dioxane, and tetrahydrofuran, including mixtures thereof; acetone, methyl ethyl ketone, ethyl butyl ketone, diisobutyl ketone, diethyl ketone, methyl propyl ketone, methyl isobutyl ketone, isobutyl heptyl ketone, isophorone, acetophenone, 2,4-pentanedione, including mixtures thereof.

After washing, the pigment is dried at a temeprature of 90° C. to 300° C., preferably 100 to 220° C., e.g., by means of an oven, belt dryer, or spray dryer, and then ground or milled, e.g., in a steam or nitrogen micronizer.

The tinting strength of coated pigments can be determined by any of several methods known in the paint industry. One such method is the Reynold's Blue Method, A.S.T.M. D–332–26, "1949 Book of A.S.T.M. Standards," Part 5, page 31, published by American Society for Testing Material, Philadelphia 3, Pa. This test is reproducible within ±10 points. A difference of more than 20 points in measured tinting strength is, therefore, significant and a difference of 50 points can be seen visually in paints prepared from such pigments. The oil absorption of coated pigments can be determined in accordance with A.S.T.M. Method D–281–31, and the tint tone or undertone by A.S.T.M. Method D–332–26.

Titanium oxide is a well known commercial white pigment and is used in the paint, coatings, and paper industry.

The present process is more particularly described in the following examples which are intended as illustrative, only since numerous modifications and variations therein will be apparent to those skilled in the art.

EXAMPLE I

To three hundred millimeters of distilled water at room temperature, about 25° C., were added twelve milliliters of concentrated sulfuric acid. The pH of the resulting acid solution was substantially below 2.0. Thereafter, a coating solution was prepared by adding the following solutions with constant mixing to the acid solution in the following order:

(a) 136 milliliters of a sodium silicate solution having a concentration, based on $SiO_2$, of 103 grams per liter, (b) 47.5 milliliters of titanium tetrachloride solution having a concentration, based on $TiO_2$, of 105 grams per liter, and (c) 415 milliliters of an aluminum sulfate solution having a concentration, based on $Al_2O_3$, of 58 grams per liter.

An aqueous slurry of pigmentary titanium dioxide was prepared by adding 1,000 grams of uncoated titanium dioxide to 3.75 liters of water and the pH of the slurry adjusted to between 9–10 with a 10 percent NaOH solution. The premixed coating solution was then added to the aqueous titanium dioxide slurry with constant stirring. The pH of the resulting slurry was about 2. The temperature of the aqueous titanium dioxide slurry containing the coating solution was then raised to 85° C. and digested at such temperature for about 1 hour with stirring. Thereafter, the aqueous slurry was neutralized was gaseous ammonia to a pH of between 7 and 8. After digestion at this pH for about one hour, the flocculated titanium dioxide was recovered by filtration, washed and dried. The dried, coated pigment was then double micronized (two passes) with room temperature nitrogen in a Gem TX Laboratory Trost Jet Mill (George W. Helme Co., Inc.). Pressure on the pusher (feed) jet was 240 pounds per square inch gage and pressure on the opposing jet was 220 pounds per square inch gage. The micronized pigment was then subjected to physical testing. The coated pigment had the following values:

Tinting strength—1760
Tint tone—Blue 3
Oil absorption—27.2

EXAMPLE II

The procedure of Example I was repeated, except that the coated pigment was double micronized (two passes) at a pusher jet pressure of 140 pounds per square inch gage and an opposing jet pressure of 110 pounds per square inch gage. The coated micronized pigment exhibited the following properties:

Tinting strength—1740
Tint tone—Blue 2
Oil absorption—32.1

EXAMPLE III

The procedure of Example I was repeated, except that the coated pigment was micronized once at a pusher jet pressure of 240 pounds per square inch gage and an opposing jet pressure of 220 pounds per square inch gage, followed by a second micronizing at a pusher jet pressure of 140 pounds per square inch gage and an opposing jet pressure of 110 pounds per square inch gage. The resultant pigment exhibited the following properties:

Tinting strength—1780
Tint tone—Blue 3
Oil absorption—31.2

EXAMPLE IV

The procedure of Example I was followed, except that the coated pigment was micronized only once, at a pusher jet pressure of 140 pounds per square inch gage and an opposing jet pressure of 110 pounds per square inch gage. The coated micronized pigment exhibited the following properties:

Tinting strength—1750
Tint tone—Blue 2
Oil absorption—35.2

The data of Examples I through IV show that the use of the coating procedures illustrated therein yields pigment having good pigmentary properties.

EXAMPLE V

An aqueous slurry of the same titanium dioxide pigment employed in Examples I–IV was prepared by adding, with mixing, 1,000 grams of the pigment to 3.75 liters of distilled water at room temperature and the pH adjusted to between 9–10 with a 10 percent NaOH solution. Thereafter, 136 milliliters of sodium silicate solution (103 grams per liter based on $SiO_2$ content) was added, at room temperature, with mixing, to the slurry and allowed to disperse for about 10 minutes. Then, 47.5 milliliters of a titanium tetrachloride solution (105 grams per liter based on $TiO_2$ content) and 415 milliliters of an aluminum sulfate solution (58 grams per liter based on $Al_2O_3$ content) at room temperature were added successively with continued mixing to the pigment slurry. The temperature of the aqueous pigment slurry containing the coating compounds was raised to about 85° C. Thereafter, the coated pigment was recovered by the slurry which had been at about 2 was then adjusted to between 7–8 with gaseous ammonia. The neutralized slurry was permitted to digest for about 1 hour at about 85° C. Thereafter, the coated pigment was recovered by filtering, washing, and drying. The dried, coated pigment was double micronized with mill described in Example I at a pusher jet pressure of 240 pounds per square inch gage, and an opposing jet pressure of 220 pounds per square inch gage. The coated micronized pigment exhibited the following properties:

Tinting strength—1720
Tint tone—Blue 3
Oil absorption—25.7

The tinting strength of this pigment was 40 points lower than the pigment of Example I and also had a lower oil absorption. Since a difference of more than 20 points in measured tinting strength is significant, a difference of 40 points represents a real improvement. The only difference between the pigments prepared in Examples I and V was in the coating procedure.

EXAMPLE VI

Three experimental runs were performed in a similar manner to Examples I–V, i.e., the same procedures with the same materials and quantities of materials were employed. In Run A, titanium tetrachloride and aluminum sulfate solutions were added sequentially to the aqueous pigment slurry at a pH of between 9–10. After addition of the titanium tetrachloride and aluminum sulfate, the pH dropped to between 1 and 2. Following digestion for about one hour at room temperature, the pH was raised to about 4.5 with gaseous ammonia at which point the sodium silicate solution was added. Neutralization to a pH of between 7–8 was completed with the addition of gaseous ammonia and the slurry permitted to digest for about one hour at 85° C. The recovered and dried pigment was subjected to a single pass micronizing at a pusher jet pressure of 130 pounds per square inch gage and an opposing jet pressure of 110 pounds per square inch gage.

In Run B, the sodium silicate solution was first added to the aqueous pigment slurry, and then the titanium tetrachloride and aluminum sulfate solutions added. After digestion for about one hour at about 85° C., the pH of the aqueous pigment slurry was adjusted from between 1–2 to between 7–8 with gaseous ammonia and the pigment recovered. The dry pigment was subjected to a single pass micronizing at a pusher jet pressure of 130 pounds per square inch gage and an opposing jet pressure of 110 pounds per square inch gage.

In Run C, the coating compounds were premixed as in Example I, and then added to the aqueous pigment slurry with mixing. Neutralization, digestion, and recovery followed the procedures of Runs A and B. The dry, coated pigment was subjected to a single pass micronizing at a pusher jet pressure of 130 pounds per square inch gage and an opposing jet pressure of 110 pounds per square inch gage. Each of the coated-micronized pigments from Runs A, B, and C were physically tested and the results recorded in Table I.

TABLE I

|  | Run A | Run B | Run C |
| --- | --- | --- | --- |
| Tinting strength | 1,580 | 1,600 | 1,630. |
| Tint tone | Blue 1 | Blue 2 | Blue 2. |
| Oil absorption | 34.5 | 32.3 | 35.2. |

The data contained in Table I show that the coating procedure of the present invention results in pigment having higher tinting strength and oil absorption values.

EXAMPLE VII

*Run A.*—To 300 milliliters of distilled water in a glass beaker are added 12 milliliters of concentrated sulfuric acid. Thereafter, and in the order indicated, 47.5 milliliters of a titanium tetrachloride solution (105 grams/liter based on $TiO_2$), 415 milliliters of an aluminum sulfate solution (58 grams/liter based on $Al_2O_3$), and 271 milliliters of a sodium silicate solution (103 grams/liter, based on $SiO_2$) are added to the sulfuric acid solution. A slight white precipitate is formed in the beaker.

*Run B.*—Run A was repeated, except that the coating solutions are added in the following order: aluminum sulfate, titanium tetrachloride, and sodium silicate. A slight white precipitate is formed in the glass beaker.

*Run C.*—Run A was repeated, except that the sulfuric acid was not introduced to the 300 milliliters of distilled water. A heavy white precipitate formed in the coating solution.

*Run D.*—Run A was repeated, except that the coating solutions were added in the following order: sodium silicate, titanium tetrachloride, and aluminum sulfate. No precipitate was seen to form in the beaker.

*Run E.*—Run A was repeated, except that the coating solutions were added in the following order: titanium tetrachloride, sodium silicate, and aluminum sulfate. No precipitate was seen to form in the beaker.

*Run F.*—Run A was repeated, except that the coating solutions were added in the following order: aluminum sulfate, sodium silicate, and titanium tetrachloride. A slight white precipitate was formed in the glass beaker.

The data of Example VII show that when premixed solutions of hydrolyzable compounds of titanium, aluminum and silicon are employed, a certain sequential order of addition of such compounds is necessary to avoid the formation of a precipitate in the premixed coating solutions. The presence of a precipitate shows that not all of the coating compounds used is available for coating pigment and, therefore, inadequate coating levels will be achieved.

While there are above described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

What is claimed is:

1. A process which comprises admixing pigmentary titanium dioxide with a coating solution having a pH below about 2.5 and comprising hydrolyzable titanium compound, hydrolyzable aluminum compound and hydrolyzable basic silicon compound in amounts sufficient to yield from 0.05 to 10 weight percent hydrous titania, calculated as $TiO_2$, from 0.05 to 15 weight percent hydrous alumina, calculated as $Al_2O_3$, and from 0.01 to 10 weight percent hydrous silica, calculated as $SiO_2$, said aluminum compound being added to said coating solution subsequent to said basic silicon compound, increasing the pH of the resulting slurry to flocculate the pigment and recovering pigmentary titanium dioxide coated with hydrolytic products of said hydrolyzable titanium, aluminum and basic silicon compounds.

2. A process according to claim 1 wherein the hydrolyzable titanium, aluminum, and basic silicon compound are titanium tetrachloride, aluminum sulfate and sodium silicate.

3. A process according to claim 1 wherein said coating solution is prepared by adding titanium, aluminum, and basic silicon compound to relatively pure water that has been acidified with anion to a pH of less than about 2, the basic silicon compound having been added first to the acidified water.

4. A process according to claim 3 wherein the order of addition is (a) basic silicon compound, (b) titanium compound, and (c) aluminum compound.

5. A process according to claim 1 wherein said coating solution is prepared by adding basic silicon compound to titanium compound followed by the addition of aluminum compound to said basic silicon compound-titanium compound mixture.

6. A process according to claim 1 wherein the total amount of combined hydrolytic products of said titanium, aluminum and silicon compounds coated on the pigment is from 2 to 20 weight percent.

7. A process according to claim 1 wherein said coating solution is prepared by adding titanium, aluminum and basic silicon compound to relatively pure water that has been acidified with anion to a pH of less than about 2.

8. A process of coating titanium dioxide pigment which comprises forming a coating solution by admixing hydrolyzable basic silicon compound in an amount sufficient to yield from 0.01 to 10 weight percent hydrous silica, calculated as $SiO_2$, and relatively pure water acidified with anion to a pH below about 2.5 and adding thereto hydrolyzable aluminum and titanium compounds in amounts sufficient to yield from 0.05 to 15 weight percent hydrous alumina, calculated as $Al_2O_3$, and from 0.05 to 10 weight percent hydrous titania, calculated as $TiO_2$, admixing said coating solution with an aqueous slurry of titanium dioxide, neutralizing the resulting mixture with alkaline agent from a pH below about 5 to a pH of from about 6.5 to 10, and recovering titanium dioxide coated with hydrolytic products of said hydrolyzable aluminum, titanium and silicon compounds.

9. A process according to claim 8 wherein the aluminum compound is added subsequent to the titanium compound during formation of the coating solution.

10. A process according to claim 8 wherein the aluminum compound is aluminum sulfate, the titanium compound is titanium tetrachloride, and the silicon compound is sodium silicate.

11. A process of coating titanium dioxide pigment which comprises:
    (a) forming a coating solution by adding basic hydrolyzable silicon compound in an amount sufficient to yield from 0.01 to 10 weight percent hydrous silica, calculated as $SiO_2$, to relatively pure water that has been acidified with anion to a pH below about 2, and adding thereto hydrolyzable titanium and aluminum compounds in amounts sufficient to yield from 0.05 to 10 weight percent hydrous titania, calculated as $TiO_2$, and from 0.05 to 15 weight percent hydrous alumina, calculated as $Al_2O_3$,
    (b) admixing the coating solution with an aqueous slurry of titanium dioxide having a pH below about 5,
    (c) digesting the slurry formed as a result of steps (a) and (b) for from 5 minutes to 6 hours at from 30° C. to 100° C.,
    (d) neutralizing the slurry with alkaline agent to a pH of from about 6.5 to 10,
    (e) digesting the neutralizing slurry for from 30 minutes to 20 hours at from 60° C. to 95° C., and
    (f) recovering titanium dioxide coated with the hydrolytic products of said hydrolyzable aluminum, titanium and silicon compounds.

12. A process of coating titanium dioxide pigment which comprises:
    (a) forming a coating solution by adding sodium silicate in an amount sufficient to provide from 0.01 to 10 weight percent hydrous silica, calculated as $SiO_2$, to deionized water that has been acidified with anion to a pH of below about 2, and adding thereto titanium tetrachloride and aluminum sulfate in amounts sufficient to provide from 0.05 to 10 weight percent hydrous titania, calculated as $TiO_2$, and from 0.05 to 15 weight percent hydrous alumina, calculated as $Al_2O_3$,
    (b) admixing the coating solution with an aqueous slurry of titanium dioxide having a pH below 5,
    (c) neutralizing the slurry formed in step (b) with alkaline agent to flocculate the titanium dioxide, and
    (d) recovering titanium dioxide coated with the hydrolytic products of sodium silicate, titanium tetrachloride and aluminum sulfate.

13. A process of coating the surface of titanium dioxide pigment, which comprises forming a slurry of said pigment in an aqueous medium, admixing with said slurry an aqueous solution having a pH below about 2.5 and to which has been added hydrolyzable titanium, aluminum and basic silicon compounds in amounts sufficient to yield from 0.05 to 10 weight percent hydrous titania, calculated as $TiO_2$, from 0.05 to 15 weight percent hydrous alumina, calculated as $Al_2O_3$, and from 0.01 to 10 weight percent hydrous silica, calculated as $SiO_2$, the aluminum compound having been added to said aqueous solution subsequent to the silicon compound, while maintaining the pH of the slurry below about 5, raising the pH of the slurry above 5 to coagulate the pigment as flocs, and recovering the flocculated pigment.

14. A process according to claim 13 wherein the titanium dioxide pigment is produced by vapor phase oxidation of titanium tetrahalide.

References Cited

UNITED STATES PATENTS

| | | | |
|---|---|---|---|
| 2,187,050 | 1/1940 | Patterson | 106—300 |
| 2,297,523 | 9/1942 | Allan et al. | 106—300 |
| 2,868,663 | 1/1959 | Jarmus et al. | 106—300 X |
| 3,035,966 | 5/1962 | Siuta | 117—100 X |
| 3,068,113 | 12/1962 | Strain et al. | 106—300 |
| 3,146,119 | 9/1964 | Ritter | 106—300 |
| 3,152,000 | 10/1964 | Kingsbury | 106—300 |
| 3,212,911 | 10/1965 | Berstein et al. | 106—300 |
| 3,214,284 | 10/1965 | Wilson | 106—300 |
| 3,383,231 | 5/1968 | Allan | 106—300 |
| 3,385,718 | 5/1966 | Hafford | 106—308 X |
| 3,203,818 | 8/1965 | Rechmann et al. | 106—308 X |
| 3,251,705 | 5/1966 | Rieck et al. | 106—300 |

FOREIGN PATENTS

| | | |
|---|---|---|
| 1,016,777 | 1/1966 | Great Britain. |
| 1,022,621 | 3/1966 | Great Britain. |
| 224,322 | 9/1958 | Australia. |
| 248,100 | 12/1960 | Australia. |

WILLIAM D. MARTIN, Primary Examiner

M. R. P. PERRONE, Jr., Assistant Examiner

U.S. Cl. X.R.

117—169; 160—300, 308